United States Patent [19]

Hatch et al.

[11] Patent Number: 5,764,184

[45] Date of Patent: Jun. 9, 1998

[54] METHOD AND SYSTEM FOR POST-PROCESSING DIFFERENTIAL GLOBAL POSITIONING SYSTEM SATELLITE POSITIONAL DATA

[75] Inventors: Ronald R. Hatch, Wilmington, Calif.; Frederick Nelson, Fenton, Ill.

[73] Assignee: Deere & Company, Moline, Ill.

[21] Appl. No.: 814,033

[22] Filed: Mar. 10, 1997

[51] Int. Cl.$^6$ .............................. H04B 7/185; G01S 5/02
[52] U.S. Cl. ............................................................ 342/357
[58] Field of Search ........................... 342/357; 364/449.9

[56] References Cited

U.S. PATENT DOCUMENTS

| 5,349,531 | 9/1994 | Sato et al. | 342/357 |
| 5,490,073 | 2/1996 | Kyrtsos | 342/357 |

Primary Examiner—Theodore M. Blum
Attorney, Agent, or Firm—Flehr Hohbach Test Albritton & Herbert LLP

[57] ABSTRACT

In a DGPS, accurate post-processed corrections to user receiver locations are made while minimizing the amount of data required to be stored at reference station and user receiver positions. Further, such corrections are available even if reference station corrections cannot be received by the user in real-time. The user receiver acquires in-view GPS satellites, computes, and stores user stand-alone position, time of computation, and acquired satellite identification. Reference stations generate correction data for the same satellites at the same time period, which correction data are broadcast but need not be received by the user in real-time. Almanac information for the relevant satellites is also made available to at least the user receiver. Stand-alone user receiver positional data and the almanac data for the same acquired satellites are used by a CPU, located at a remote site able to receive reference station transmissions and/or in the user receiver, to compute corrections to user receiver positions.

20 Claims, 3 Drawing Sheets

METHOD AND SYSTEM FOR POST-PROCESSING DIFFERENTIAL GLOBAL POSITIONING SYSTEM SATELLITE POSITIONAL DATA

FIELD OF THE INVENTION

The present invention relates generally to differential global positioning system ("GPS") satellite systems, and more specifically to systems and methods to recover accurate positional information from such systems despite interruption in real-time reception of differential GPS correction data.

BACKGROUND OF INVENTION

The GPS is a satellite-based navigation and time transfer system developed by the U.S. Department of Defense. GPS satellites have accurate on-board clock timekeeping systems that are synchronized to GPS time. The satellites also have sufficient uplink and memory capability to receive accurate descriptions of their orbit from the GPS Ground Control System, which orbit descriptions are retained for rebroadcast to GPS user equipment.

Using such clock and orbit information, GPS satellites transmit to earth navigational data that include satellite orbital position and satellite clock offset from GPS time. At twelve minute intervals, each GPS satellite broadcasts a full set of almanac information. The almanac data contains relatively few parameters, but the data may be valid for several weeks. The satellites also broadcast higher accuracy ephemerides that provide substantially more parameters relating to orbit position information, but the ephemerides are only valid for four hours. Marine, airborne and terrestrial user receivers can use the GPS satellite broadcast navigational data to determine user receiver positions.

FIG. 1 depicts a generalized GPS system in which the position of an earth-based user U1 (e.g., a user on or about earth E) is determined using signals received by a GPS receiver UR1 from at least four satellites GS1, GS2, GS3, GS4 that are in view relative to the user's location (ux, uy, uz). By "in view" it is meant that user receiver can receive signals from these satellites. By way of example, satellite GS1 is in view, and is at an orbital position denoted as (x1, y1, z1) in Cartesian coordinates.

The GPS satellites transmit signals at 1.575 MHz ("L1") and 1.227 MHz ("L2") frequencies. These signals are modulated by a coarse-acquisition pseudo-random ("C/A") code, an encrypted precision pseudo-random ("P") code, and navigation data. Although the P code is encrypted and thus unavailable to many users, a user can still determine a pseudo-range to each GPS satellite in view, based upon time of arrival of the C/A code in the received satellite signals.

For example, the user's receiver internally generates its own C/A code signal, which it then phase-locks onto a received GPS satellite C/A signal. Since the velocity of light (e.g., of radio signals) is known, the time or phase lag at signal-lock provides a measure of the scalar distance or pseudo-range from the receiver to the satellite in question. For example, distance Rs4 in FIG. 1 denotes the pseudo-range from user U1 to satellite GS4 plus any clock difference between U1 and S4. Using such pseudo-ranges for GPS satellites in view, the user can then compute a position fix using orbit position data and clock offset data received from the satellites. (To avoid unduly cluttering FIG. 1, pseudo-range scalar distances have not been drawn from each reference station to each GPS satellite.)

However, maximum stand-alone accuracy of positional information from the GPS system is intended for use only by the U.S. military, and toward that end so-called selective availability is practiced. In an attempt to prevent non-U.S. military users from obtaining maximum accuracy positional data, the GPS clocks are intentionally dithered and/or imprecise predicted satellite ephemerides are transmitted. Thus, non-U.S. military recipients of satellite data will be provided with intentionally slightly erroneous offsets from GPS time, and with intentionally slightly erroneous expected satellite orbital positions. Moreover, ionosphere and troposphere conditions can delay arrival of GPS signals at the user's location. All of these factors can affect accuracy and integrity of GPS provided positional information, such that stand-alone accuracy for most (e.g., non-U.S. military) users has a radial positional error of about 50 m. standard deviation.

Not to be thwarted by the intentionally imprecise transmitted GPS signals, several techniques have evolved to provide users with more accurate positional data. For example, it is known in the art to improve accuracy and integrity of received GPS signals by using one or more ground-based reference stations, e.g., Rref1 and Rref2. These reference stations are positioned at precisely known ground locations, which are often determined by surveying. GPS systems that use GPS-satellite transmitted data and reference station generated ground-correction data are termed differential GPS ("DGPS").

In the DGPS of FIG. 1, reference station Rref2 knows its own exact position (e.g., r2x, r2y, r2z) and knows the anticipated position of a satellite in view, e.g., satellite GS3 at (x3, y3, z3). Upon receiving GPS signals from satellite GS3, reference station Rref2 can measure a local pseudo-range error, which is a scalar correction to the measured pseudo-range from Rref2 to S3.

The reference stations then transmit such corrections for use by one or more GPS receivers URn within receiving range. Known as pseudo-range residuals, the correction data may be stored in memory within the reference stations for later transmission, or may be transmitted in real-time. In some systems, the reference stations can transmit directly to user receivers and in other systems transmission is to a non-GPS satellite, e.g., satellite, CS1 communicating at C-band frequencies. Such satellite can then rebroadcast the data over a wider range, in real-time or subsequently.

It will be seen that GPS satellite transmitted orbital position information serves two distinct functions with respect to more accurate computation of a user position. A first use is to compute an accurate range using satellite position and user estimated position. Understandably, arriving at the computed range, e.g., the distance between (x3, y3, z3) and (r2x, r2y, r2z), requires highly accurate GPS satellite positional data and clock offset data.

This computed range is then compared against measured ranges (e.g., scalar pseudo-ranges) to determine the amount by which estimated user position must be changed. The differences between computed ranges and measured ranges are generally referred to as measurement residuals. These measurement residuals are used to compute corrections to the (ux, uy, uz) components of the user estimated position, and to compute a correction for the user receiver clock.

The second use of GPS orbital position data pertains to mapping measurement residuals into user position corrections. Several different techniques are commonly used for such mapping, including by way of example least-squares methods, and Kalman filter methods. In any event, such mappings use direction cosines of a vector between the user receiver and the GPS satellite, e.g., the unit vector in the direction of the vector Ur2-GS3 at angle θ from reference station Rref2 to satellite GS3 in FIG. 1. Direction cosines are a function of GPS orbital position. However, the high altitude (perhaps 20,000 Km) of the satellites above earth renders the direction cosines very insensitive to errors in GPS satellite positions.

Thus, the user receiver UR1 can generate a pseudo-range to satellites in view using C/A signal phase measurements. However to make accurate positional changes, receiver UR1 must still generate line-of-sight unit vectors, comprised of direction cosines, to the satellites in question. Ground based reference stations receive GPS satellite data, which the reference station use to compute measurement residual data representing corrections to stand-alone pseudo-range measurements. The data are then transmitted by the reference stations, either directly or via satellite-re-transmission, to user receivers. The correction data are in terms of corrections along a line-of-sight vector. Using this reference station(s)-generated correction data, the user receiver can more accurately determine its (ux, uy, uz) position at different times.

When the reference station is located close to the user receiver, the resultant system is known as a local area differential GPS ("LADGPS"). In an LADGPS, error sources are strongly correlated because position r2x, r2y, r2z and user receiver position ux, uy, uz are relatively close. Indeed, user-receiver position accuracy can be better than 1 m standard deviation using code measurement techniques, or better than 2 cm using carrier-phase measurement techniques.

When multiple reference stations are used to provide measurement corrections over a wide area, the resultant system is known as a wide area differential GPS ("WADGPS"). Using code measurement and other techniques to adjust for variation of error sources over the area, WADGPS can also yield a position accuracy of about 1 m standard deviation.

One limitation encountered with prior art LADGPS or WADGPS systems is that interruption in the real-time reception of correction data broadcast by the reference stations will prevent a user from achieving higher positional accuracy. For example, typically in WADGPS systems, reference stations transmit measurement corrections in real-time to C-band communication satellites for real-time rebroadcast to user receivers. But such satellite rebroadcast correction data can become unavailable over certain strips of earth due to interference from land-based microwave transmission links. In some systems, measurement correction broadcasts may on occasion be purposely made unavailable in real-time in certain regions and/or time frames.

Thus, for use in differential local area and wide area GPS systems, there is a need for a method and system by which a user position may be more accurately determined, even in the absence of real-time reference receiver-generated correction information. Preferably such method and system should permit data stored in reference receivers and the user receiver to be post-processed to provide the user with increased accuracy positional information. Preferably such post-processing should minimize the amount of data that must be stored at the reference stations and at the user receiver.

The present invention provides such a method and system.

SUMMARY OF THE INVENTION

In a differential global position satellite system, user receivers receive GPS satellite data and correction data that has been broadcast. But such correction data may not always be receivable in real-time by a user receiver for correcting receiver position. Nonetheless, using post-processing techniques, the present invention permits accurate user positions to be determined.

The user receiver acquires in-view GPS satellites, and forms pseudo-range measurements to each satellite. If pseudo-range corrections from the reference station are available in real-time, they are applied to the measured pseudo-ranges. These corrected pseudo-ranges together with the broadcast satellite position data are then used to compute accurate user positions. But if the pseudo-range corrections from the reference station are not available in real-time, the user GPS receiver computes and stores an uncorrected (non-DGPS) stand-alone position. The user GPS receiver will also store the identity of each satellite whose data were used in the position computation, together with the time of the measurements.

Reference stations generate correction data for the same satellites at the same time period. These correction data are typically broadcast in real-time, and are also stored at the reference station and/or at a separate ground based facility.

The reference station receives, or otherwise has available to it, GPS satellite almanac information that is stored together with the correction data. Satellite orbit positions determined from almanac data are less accurate than positions computed from the ephemerides for each acquired satellite. However, the present invention recognizes that the almanac data are sufficiently accurate for computation of direction cosines. This is true because the high altitude of the GPS satellites renders the direction cosines relatively insensitive to errors in satellite positions.

Data that are stored for use by the present invention include the stand-alone position/time and satellite identities recorded by the user receiver, and the satellite pseudo-range correction and almanac data recorded by the reference receiver.

These data can be combined in non-real-time to generate an accurate, differentially corrected user position, even for time intervals when real-time pseudo-range corrections were not available to the user GPS receiver. The stand-alone user receiver positional data and the pre-stored almanac data for the same acquired satellites are used to compute relevant direction cosines. These direction cosines are then used to map reference station measurement corrections that were made at the same time period for the satellites used in computing the user receiver stand-alone position. Measurement correction data are preferably weighted and then mapped (using the direction cosines) into a correction of the stand-alone position.

The above-described method may be implemented in software stored within the user receiver and executed by a CPU therewithin. Alternatively, position correction computations may be performed elsewhere, perhaps using a remotely located computer system. Such remotely located system could receive user-recorded data and reference station generated data from radio transmission, or via any of a number of ways including persistent storage media such as on computer diskette, computer harddisk, compact storage ("CD") disk, optical disk, magnetic tape. The remote system would then generate and make available the position correction information for the user.

Use of pre-stored almanac data permits reference stations and user receiver memory to store substantially less information than if the more accurate ephemeride data were used. There is no need to store pseudo-range measurements for each satellite acquired by the user GPS receiver. Instead, only the stand-alone position/time and satellite identities are required, which results in a substantial reduction in the size of user receiver memory required for storage.

Other features and advantages of the invention will appear from the following description in which the preferred embodiments have been set forth in detail, in conjunction with the accompanying drawings.

DETAILED DESCRIPTION OF THE PREFERRED EMBODIMENT

In a DGPS, the present invention utilizes insensitivity of direction cosines to GPS satellite orbital positions to map reference station corrections to user receiver stand-alone position information. Advantageously, accurate post-processed user receiver position corrections may be made even if the reference station corrections cannot be received in real-time, for instance, due to radio interference.

In brief overview, the user receiver acquires in-view GPS satellites, computes and stores user stand-alone position, time of computation, and identity of the satellites whose data were used to compute the stand-alone position. For the same time period and using the same satellites, reference stations generate correction data. More specifically, measurement residuals are computed in real-time at reference station location(s) and are used to generate pseudo-range corrections that are recorded together with almanac information. The reference stations broadcast this data directly or via a satellite re-broadcast. However, this data may not necessarily be received in real-time at the user receiver. Thus, regardless of whether the reference station generated data can be received, at the user receiver location, uncorrected (non-DGPS), stand-alone position/time and satellite identity information will be recorded.

In such post-processing as necessary to apply measurement corrections to user receiver position, GPS satellite position information is only used for direction cosine computation, for which a single GPS almanac is sufficiently accurate for use through at least one week. Thus, advantageously it is generally sufficient to store a single almanac entry for each satellite once a week to obtain satellite position information needed to recompute a more accurate user position solution.

Figure 1:
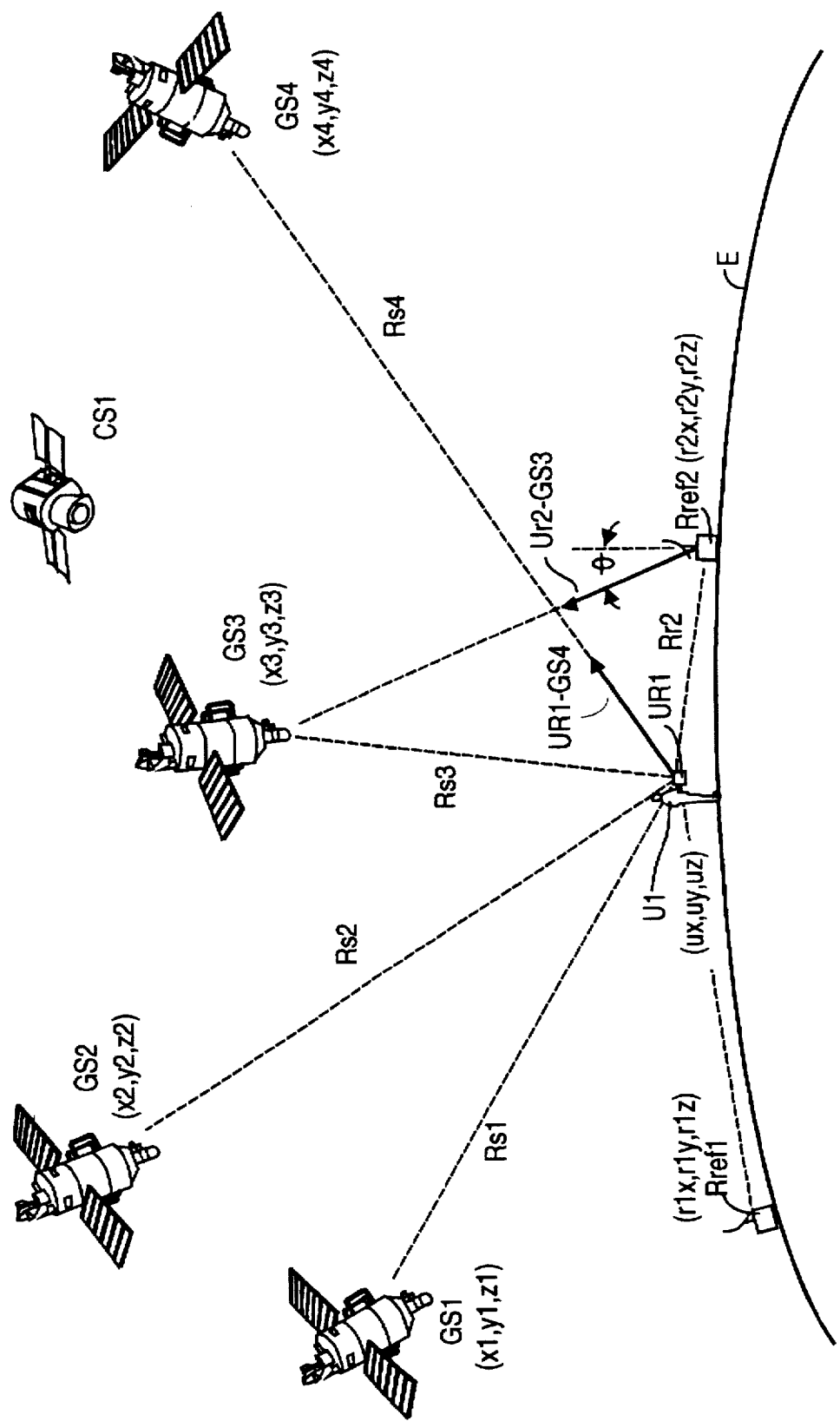
FIG. 1 depicts a WADGPS or LAGPS system, according to the prior art.
Figure 2:
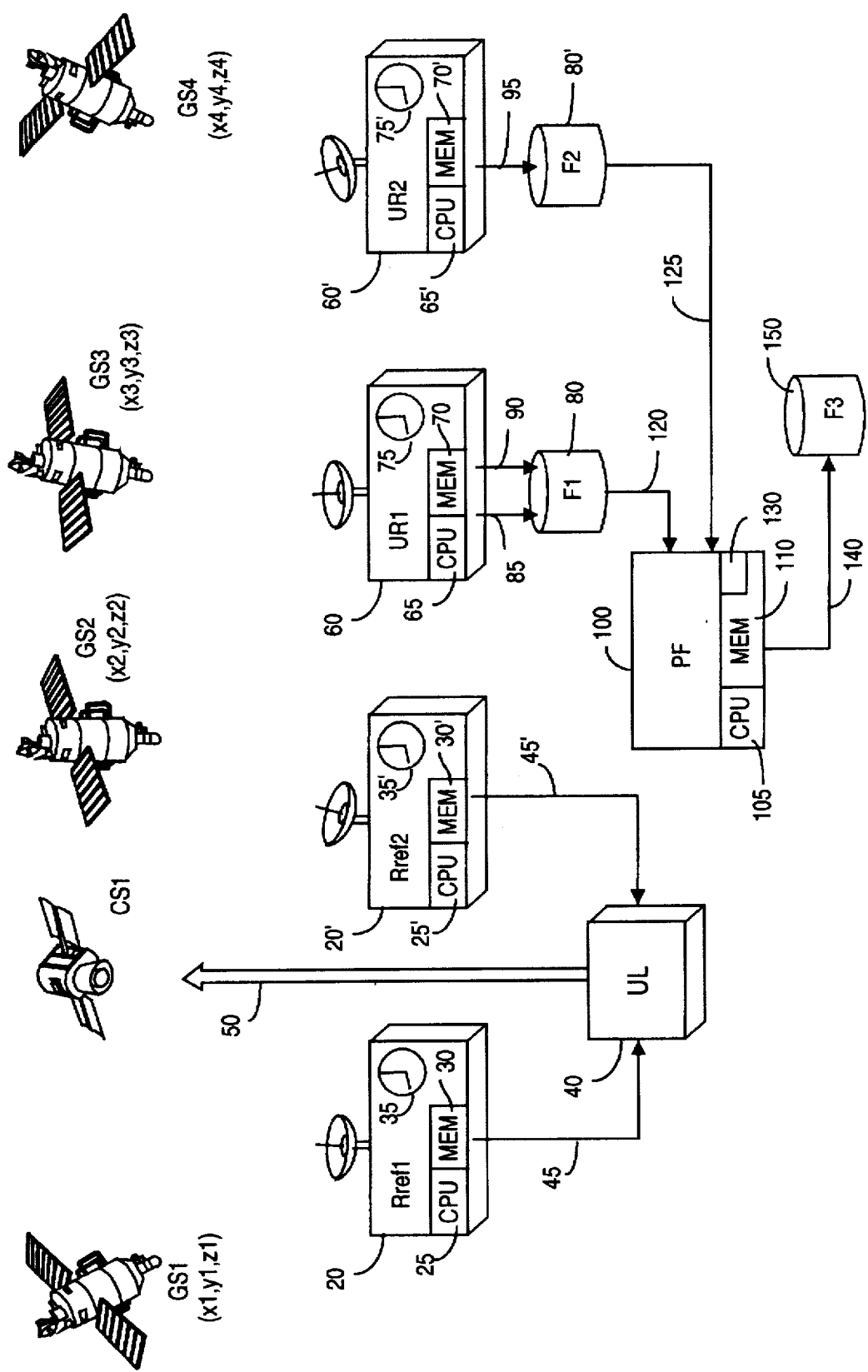
FIG. 2 depicts a portion of a WADGPS or LAGPS system with which different embodiments of the present invention may be practiced.

FIG. 2 depicts portions of a system with which the present invention may be practiced. Five in-view satellites are shown, namely four GPS navigation satellites GS1, GS2, GS3, and GS4 and one C-band communications satellite, CS1. Two reference stations 20, 20' are shown, also noted respectively as Rref1 and Rref2 per the nomenclature of FIG. 1. Each reference station includes at least a central processing unit ("CPU") such as CPU 25, 25', preferably a memory unit 30, 30', and a timekeeping mechanism 35, 35'.

Each reference station provides its satellite pseudo-range correction data, time information, and almanac information to an uplink station 40 ("UL"), for example via data links 45, 45'. In the embodiment of FIG. 2, uplink station 40 transmits data received from all reference stations to communication satellite CS1 via uplink data path 50. Communication satellite CS1 rebroadcasts the pseudo-range correction data thus uplinked to user receivers in the system. In some systems, the reference receiver may directly transmit data to user receivers, rather than uplink the data for communication satellite re-broadcast.

FIG. 2 also depicts two user receivers 60, 60' (or UR1, UR2 respectively), wherein each receiver preferably includes at least a CPU 65, 65', memory 70, 70', a timekeeping mechanism 75, 75', and a storage mechanism, e.g., 80, 80' (also denoted F1, F2). Some or all of the storage mechanisms may in fact be physically remote from an associated user receiver. In some systems, storage mechanisms F1, F2 may obviate the need for memory units 70, 70', or vice versa. Each user receiver is preferably capable of receiving signals from communications satellite CS1, as well as from in range GPS navigation satellites GS1-GS4.

In a preferred embodiment, user receiver UR1 (or equivalent) is located at a site that is free from interference that might impair radio reception of reference receiver generated data. In this embodiment, user receiver UR1 continuously records data received from each reference station, for example as re-broadcast from communications satellite CS1. This received data includes pseudo-range corrections and almanac information. In FIG. 2, the pseudo-range corrections are shown coupled via line or communication link 85 to storage device F1, and almanac information is coupled via line or communications link 90 to storage device F1. Any or all of the storage devices, including device F1, may include computer hard disks, recordable CD media, magnetic tape, among other storage media.

In this preferred embodiment, user receiver UR2 is a component within a mobile system operating in areas possibly subject to interference that can block radio reception of reference receiver generated data, for example, signals from communications satellite CS1. By way of example, receiver UR2 may be mounted on a tractor used to work agricultural fields, or on a bulldozer used to work land fills. In these and other applications, it is often necessary to know accurately the position of receiver UR2 as a function of time. Even during periods of radio interference that disrupt receipt of reference receiver data, UR2 can still record its stand-alone, uncorrected, non-DGPS position/time and satellite identity information in storage device 80' (and/or memory 70, 70'), via line or communications link 95.

In the above embodiment, a processing facility ("PF") 100 is provided at a site not necessarily in close proximity to any of the reference or user receivers. Facility 100 preferably includes a CPU 105 and memory 110. Facility 100 is coupled to receive via a wire or communications link 120 from UR1-associated storage, files of reference station data. Receiver UR1 is intentionally positioned in an area where there is good reception of reference station data. Facility 100 also receives via a wire or communications link 125 from UR2-associated storage, data for user position/time. It is understood that any or all of communication links 45, 45', 85, 90, 95, 120, 126 (and 140) may be implemented using radio or infra red transmission, or the transportation of data on storage media such as computer hard disk, diskette, compact storage ("CD") disk, optical disk, magnetic tape, by way of example.

Figure 3:
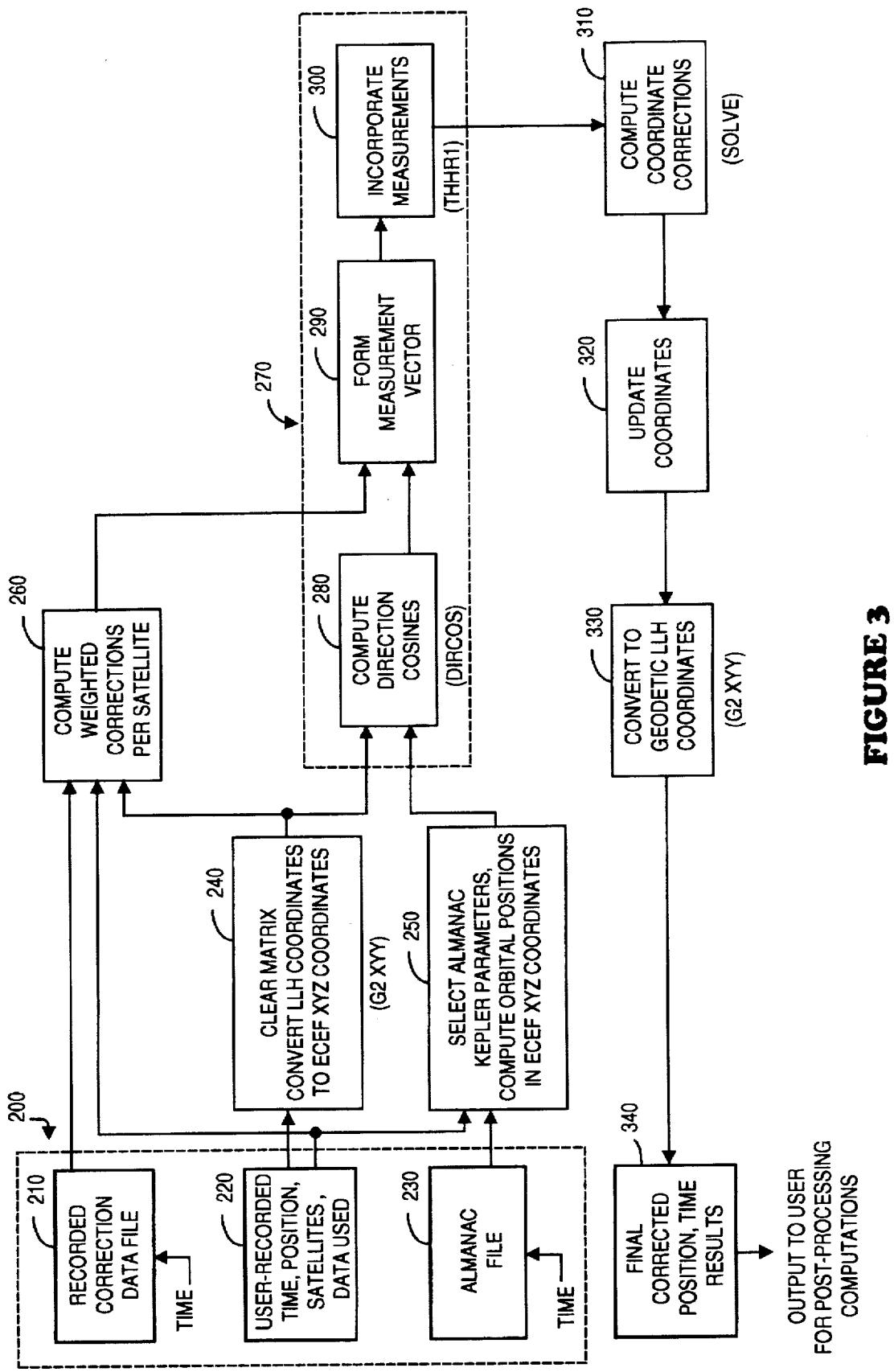
FIG. 3 is a flow chart depicting a method for providing accurate user position data, according to the present invention.

Preferably loadable or storable within memory 100 is a software routine 130 that is executed by CPU 105 to perform the various method steps shown in FIG. 3, to thus practice the present invention. In this embodiment, the output of processing facility 100 is a data stream of corrected user position and time information that is coupled via a communication link 140 to a storage device 150 (F3).

The specific form of information recorded in memory at the reference station(s) and the user receiver position necessary for recovery of accurate post-processed user position will now be described.

At the (ux,uy,uz) position of user receiver UR2 60', at least the following data are to be recorded, preferably within memory 70' and/or 80':

(a) stand-alone computed position of user receiver UR1, e.g., without benefit of any differential corrections from any reference station(s);

(b) time at which measurements used in the stand-alone position computations were obtained; and, (c) identification of GPS satellites used in the position computations.

At the (ux, uy, uz) position of user receiver UR160, located in an area where there is good reception of reference data, at least the following data are to be recorded, preferably within memory 70 and/or 80:

(a) satellite pseudo-range correction data from all reference receiver(s)

(b) time at which the corrections were generated; and (c) almanac information.

Information from the reference receiver(s) may of course be stored in more than one form. However, in practice, an especially reliable and compact form of storage is to specifically record measurement corrections for each GPS satellite that would have transmitted if real-time communications link were available at the time, together with the above-described almanac data.

The theory underlying accurate post-processed user receiver corrections will now be described. Stand-alone user receiver position is affected by the measurement errors to each of the satellites used in the position computation.

Assume for the moment that mapping of measurement residuals into position solution is made using a least squares process. Errors in the measurement residuals will be mapped into errors in the position, an error in the receiver clock, and (depending on the number of measurements) to residual measurement errors that cannot be mapped into the four time and (x,y,z) position parameters. However it is known that measurement corrections available from the reference stations are a close approximation to (the negative of) measurement errors at the user receiver.

Thus, direction cosines are used to map reference measurement corrections for the same satellites that were used in the stand-alone user position computation, into corrections for position, for clock time, and to residual measurement errors. It is known that these separate mapped components will closely match (the negative of) the same errors present in the stand-alone user position. However, as correction to position only is of interest, clock correction and measurement residuals may be ignored. As noted, by using direction cosine computations, sufficient accuracy is obtained from a single GPS almanac, for at least one week.

When large measurement errors are present (e.g., those caused by selective availability), the specific mapping of the measurement residuals (or the measurement corrections) into a position correction will be a strong function of the specific satellites used for the solution. Thus, for successful post-processed user position corrections according to the present invention, at least one reference station must have tracked each of the satellites whose data are used to compute stand-alone user position. This requirement is not difficult to meet, especially when multiple reference stations are used, as is common in WADGPS systems.

FIG. 3 depicts a preferred method for carrying out calculations according to the present invention. As noted, in a preferred embodiment, the calculations are carried out within processing facility 100. More specifically, CPU 105 within processing facility 100 executes software 130 loadable or storable within memory 110 to perform the method depicted in FIG. 3.

At the left side of FIG. 3, method steps shown collectively as 200 represent input files, whereas step 340 represents the output file containing desired final corrections that is provided by the present invention.

At step 210, correction data obtained from reference stations is maintained as a stored file. These data may be recorded or stored at each reference station (e.g., in memory 30, 30') and at the user receiver site (e.g., in memory 70 and/or storage device 80). It is understood that for a C-band wide area system subject to interference in certain regions that include area traversed by the user receiver, these data could be recorded at a location free from such interference.

Step 220 represents user-recorded data, namely storage of at least the minimum data available to the user to be used by the present invention. These data will include stand-alone positions, identification of the satellites whose data were employed in computing the stand-alone positions, and relevant times the data were obtained. At step 220, satellite positional information will be provided. The user-recorded data associated with step 220 may include data acquired while the user receiver was in motion, perhaps over an extended period of time and area. The user receiver may have been mounted on a tractor or other motor vehicle that was performing a task, farming or terrain surveying, for example. The present invention advantageously allows the quantity of data associated with step 220 to be substantially reduced compared to prior art techniques because it is not necessary to store user GPS receiver measured pseudo-ranges.

Step 230 represents recordation of an almanac file that contains anticipated orbital positions for all GPS satellites, which position data is updated weekly. The almanac data is broadcast by every GPS satellite, and may also be broadcast by governmental and/or private agencies. The almanac data may be received by (or otherwise presented to) reference stations and user receivers to aid in the satellite acquisition process at the user receiver. In some embodiments, almanac data (step 230) and correction data (step 210) may be recorded or stored together in a single file.

Advantageously, the present invention performs acceptably well using almanac data, even if the almanac file is seven days old, if not older. The present invention's use and storage of an almanac file that need not be updated more frequently than once per week is to be contrasted with prior art use of higher accuracy ephemerides for each acquired satellite, which ephemerides must be updated every four hours (and are broadcast hourly). The ephemerides contain substantially more data than are necessary to record and process to carry out the present invention.

Method step 230 may also represent recording or storing the almanac file data at an arbitrary site that is free from reception interference. One such site might be a second receiver located in an interference free region, such as unit 60 shown in FIG. 2.

In any event, periodic broadcasting of the almanac file at step 230 implies there is no need to store all GPS satellite positional data at each reference station and user receiver, as is attempted in the prior art At step 240, the input position from user supplied positions from step 220 is received, and is converted from geodetic coordinates of latitude, longitude and height (LLH), to (x,y,z) coordinates of the earth-centered, earth-fixed frame ("ECEF"). As noted, a least-squares process analysis may be used to process measurement data relating to user positions. At step 240, the least squares process matrix is cleared prior to processing the next epoch of recorded data.

At step 260, times and list of satellites used to provide data to the user supplied file are provided from step 220, and the (ux,uy,uz) user coordinates are provided from step 240. At step 260, the file of recorded corrections from step 210 is scanned and a set of corrections for each satellite is computed.

Computation at step 260 may be accomplished in several alternative methods. In a preferred embodiment, corrections are computed as a weighted combination of corrections received from a plurality of reference stations. The weighting is computed as a function of the approximate distance between the stand-alone user position and the stored positions of the reference sites. Alternatively, corrections could be computed on the basis of recorded ionospheric and/or orbital correction functions. Other methods may instead be used, however.

Those skilled in the art will recall that given sufficient Kepler (or augmented Kepler) parameters, three-dimensional (x,y,z) positional data may be expanded and expressed as a function of any point in time. (By augmented it is meant that more than the six basic Kepler parameters are used.) At step 250, appropriate broadcast almanac augmented Kepler parameters are selected for each satellite used. This selection is based upon time and the satellites used, which information is available at step 220. In addition to selecting appropriate week-augmented kepler parameters, step 250 also computes orbital satellite position in (x,y,z) earth-centered, earth-fixed coordinates for the specific point in time indicated.

Procedures indicated collectively as 270 are computed for each satellite used in the original stand-alone user position determination, as received from step 220. More particularly, step 280 uses the user position Cartesian (x,y,z) coordinates from step 240, together with satellite orbital position Cartesian (x,y,z) coordinates from step 250. Using these coordinate data, step 280 computes direction cosines of the unit vector from the user position to the satellite position. (Vector Uu-s4 in FIG. 1, normalized to be unit length, is such a vector.)

At method step 290 a preferably five-element measurement vector is formed, in which the three (x,y,z) components of the direction cosines from step 280 are used as the first three elements. These three direction cosine components can represent sensitivities to errors in (x,y,z). The time error sensitivity (which is unity) is appended to these sensitivity errors at step 290 as the fourth element. The fifth element is the pseudo-range correction value obtained from step 260.

In a manner known to those skilled in the art, this five element vector is input to a Kalman filter, or to a standard or variation of a least-squares processing technique. In contrast to a Kalman filter technique, the least-squares process is divided into two sections: forming the least-squares matrix equation (step 290), and then solving that equation for the correction to the coordinates (step 310).

In a standard least-squares process, the matrix equation is formed in the following fashion: The measurement equation is defined by:

$$Hx=e$$

where e is the error to be removed or correction to be applied and x is the column vector correction to be determined, i.e., a correction to the x, y, z, components of user position and clock. H is the four-element row vector, comprising the sensitivity (direction cosines and one) of the vector correction x to the correction value In the standard least-squares process the measurement equation is replicated for each satellite measurement. As such, H becomes a matrix B with a row for each satellite, and e becomes a vector E with an element for each satellite. This gives the matrix measurement equation:

$$Bx=E$$

As given, there is no unique solution to this equation when there are more than four satellites. To get a unique least-squares equation with a unique solution, the equation is multiplied by B transpose (designated Bt), which results in four equations in four unknowns:

$$BtBx=BtE \text{ or } Ax=Y$$

where A is a four row-by-four column matrix resulting from the product of BtB, and where Y is a column vector resulting from the product BtE.

This least squares matrix equation Ax=Y is solved for the corrections, x, in step 310, FIG. 3. However, by way of background, a simple alternative method for obtaining A and Y will be described first.

In the measurement equation, the four element sensitivity vector H may be extended to five elements by including the value of the correction, e, as the fifth element of H. If this is done, matrix A and vector Y of the least-squares matrix equation can be formed as sub-matrices of a five row-by-five column matrix M that is formed as follows:

(a) M is initially cleared in step 240;

(b) Next, the matrix obtained for each measurement by forming HtH is added to M;

(c) When all measurements have been added to M, the matrix A is found in the first four rows and four columns of M.

(d) Column vector Y is found in the fifth column and first four rows of M.

(e) The fifth row of the matrix M can be discarded, or can be used to compute the sum of the squares of the residuals, using techniques known to those skilled in the art.

In the preferred embodiment depicted in FIG. 3, the step 290 five element measurement vector is incorporated into a least-squares square-root information filter matrix using a triangular Housholder transformation.

At step 310, the least-squares correction to the positional coordinates is computed, preferably by inverting the measurement appended least-squares matrix formed at step 290.

At step 320, corrections to the position computed in step 310 are added to the (x,y,z) user coordinates computed at step 240 to obtain a set of corrected user position Cartesian (x,y,z) coordinates.

At step 330, the Cartesian (x,y,z) coordinates available from step 320 are converted to geodetic latitude, longitude, and height coordinates.

Ultimately, method step 340 represents the final output result data, and preferably is a file made available to the user. This output file preferably contains final corrections for positions corresponding to the user-received stand-alone input positional data received at step 220, and associated time. The file recorded at step 340, e.g., in storage device 150, will thus contain corrections for each time and stand-alone user position provided at step 220.

It will be appreciated that CPU 105 execution of software 130 (see FIG. 2) can result in the procedures of FIG. 3 being carried out in real-time, although real-time execution is not necessary. Applicants' use of direction cosines enables the output file at step 340 to be generated, even using somewhat stale almanac file data.

As noted, in some embodiments the user receiver (e.g., UR2, 60') may be moved across terrain, perhaps as a result of being in a vehicle such as a tractor. It is possible that during its movements, the user receiver will not always be able to receive the reference station generated data from CS1, although GPS-generated signals are available. However, the user receiver can successfully store (e.g., in storage device 70' or 80') data pertaining to its position as a function of time, as well as identity of used GPS satellites whose data were relied upon.

As shown in FIG. 2, using media or link 125, this data obtained by user receiver 60' is communicated to processing system 100. As noted, the data may be radio transmitted, provided via modem, provided on a compact disk or optical disk, harddisk, diskette(s), among other techniques. Pseudo-range correction and almanac file data is also provided to system 100, e.g., using media or link 120.

Using the data received via media 120 and 125, processing system 100 then executes software 130 to provide corrections to the various positions of user receiver 60'. The corrected position and time data, which is output 340 in FIG. 3, is then sent from system 100 to receiver 60' (or elsewhere) to provide more accurate knowledge as to the positions traversed by user receiver 60'.

Regardless of whether the area traversed by user receiver 60' is farmland, landfill, or otherwise, it is now possible to provide a more accurate terrain map of the area traversed by the vehicle carrying the user receiver. For example, in a landfill environment, the precise location whereat potentially dangerous materials were deposited can be learned, perhaps to fulfill legal archive obligations to environmental protection entities. However, in a wide range of environments, a more accurate map of the traversed user positions may be created using post-processed data, according to the present invention. Of course other uses and embodiments for the present invention may instead be found.

Modifications and variations may be made to the disclosed embodiments without departing from the subject and spirit of the invention as defined by the following claims.

What is claimed is:

1. For use with a differential global positioning system (GPS) that includes:

a plurality of GPS satellites that transmit to earth navigational signals including at least satellite orbital position data, GPS time data, and satellite identification data;

at least one earth-based reference station that receives said navigational signals and computes at least pseudo-range correction data; and an earth-based user receiver, at a user location, able to receive said navigational signals and compute a user position;

a method for recovering accurate post-processed information as to said user position even if said pseudo-range correction data are not received in real-time, the method comprising the following steps:

(a) computing and storing stand-alone position of said user receiver at at least one time, using said navigational signals;

(b) storing time at which said navigational signals were used to compute said stand-alone position;

(c) storing identity of each of said GPS satellites whose navigational signals were used to compute said stand-alone position;

(d) using pre-stored almanac data for each of said GPS satellites whose navigational signals were used in step (a) and using information stored at step (a), step (b) and step (c) to compute a direction cosine from said user receiver to each of said GPS satellites whose navigational signals were used to compute said stand-alone position (hereinafter, said used GPS satellites);

wherein at least one said reference station computed and transmitted pseudo-range correction data for each of said used GPS satellites; and (e) using direction cosine data computed at step (d) to map each of said pseudo-range correction data corresponding to each of said used GPS satellites and for each time at which said stand-alone position was computed to obtain corrections to said user position.

2. The method of claim 1, wherein said user receiver includes at least a central processing unit coupled to a memory, and wherein at least one step of step (a), step (b), and step (c) is carried out by said user receiver.

3. The method of claim 1, wherein at least one step of step (a), step (b), and step (c) is carried out by a processing system remote from said user receiver, said processing system including at least a central processing unit coupled to a memory.

4. The method of claim 1, wherein step (a) includes converting said stand-alone position from geodetic coordinates of latitude, longitude, and height, to earth-centered earth-fixed frame (x, y, z) coordinates.

5. The method of claim 1, wherein step (e) is carried out using a least squares method.

6. The method of claim 1, wherein step (e) includes using said pseudo-range correction data and using said stand-alone position from step (a) and said time from step (b) and said identity of each satellite from step (c) to compute a weighted correction for each of said used GPS satellites.

7. The method of claim 6, wherein said weighted correction is computed as a function of approximate distance separating said stand-alone position from step (a) and a stored position of each said reference station providing said pseudo-range correction data at step (e).

8. The method of claim 6, wherein said weighted correction is computed as a function of at least one of (i) recorded ionospheric correction data, and (ii) orbital correction data for each said used GPS satellite.

9. The method of claim 1, wherein step (e) includes:

when received, using said pseudo-range correction data corresponding to each of said used GPS satellites and for each time at which said stand-alone position was computed, and using computed direction cosine information from step (d) to form a measurement vector;

wherein said measurement vector contains data from which said user position may be corrected.

10. The method of claim 1, wherein at step (e), each said direction cosine represents a unit vector between said user receiver and one of said used GPS satellites.

11. The method of claim 1, wherein at step (d) said almanac data are available in Kepler parameters for each said used GPS satellite, said almanac data being converted to earth-centered earth-fixed frame (x, y, z) coordinates.

12. The method of claim 11, further including computing orbital positions for each of said used GPS satellites, and using the computed said orbital positions to compute said direction cosines.

13. The method of claim 5, wherein at step (d) said direction cosines are available in earth-centered earth-fixed frame (x, y, z) coordinates; and further including appending to said coordinates a value of one for clock sensitivity and a measurement correction from said weighted correction.

14. The method of claim 1, wherein step (e) includes forming a measurement matrix in which a row therein includes data defining a measurement vector whose data includes at least one said direction cosine and data representing unity clock sensitivity, and extending a size of said measurement matrix using said pseudo-range correction data and coupling data in said so-extended measurement matrix to a least-squares square-root information filter matrix.

15. The method of claim 14, wherein said information filter matrix uses a triangular Householder transformation to incorporate said so-extended measurement matrix into a least-squares information filter matrix.

16. The method of claim 14, further including computing a least-squares correction to positional coordinates associated with said so-extended measurement matrix by inverting a measurement appended least-squares matrix used to form said so-extended measurement matrix.

17. The method of claim 1, wherein said pseudo-range correction data is not available to said user receiver in real-time.

18. For use with a differential global positioning system (GPS) that includes at least:

a plurality of GPS satellites that transmit navigational signals to earth including at least satellite orbital position data, GPS time data, and satellite identification data;

at least one earth-based reference station that includes a central processor unit coupled to a memory, and receives said navigational signals and computes and transmits at least pseudo-range correction data;

a system that recovers accurate post-processed information as to a user position even if said pseudo-range correction data are not available in real-time, the system including:

an earth-based user receiver that includes at least a central processor unit (CPU) coupled to a memory, said user receiver disposed at a user location and able to receive said navigational signals and, whether in real-time or subsequently, able to receive said pseudo-range correction data;

a software routine, loadable into said memory for execution by said CPU to carry out the following steps:

(a) storing in said memory a correction data file that is formed by (i) computing stand-alone position of said user receiver using said navigational signals, (ii) storing time at which said navigational signals were used to compute said stand-alone position, and (iii) storing identity of each of said GPS satellites whose navigational signals were used to compute said stand-alone position (said used GPS satellites);

wherein at least one said reference station tracks each of said used GPS satellites;

(b) loading into said memory pre-stored almanac data for each of said used GPS satellites;

(c) using the stored said correction data file and the loaded said almanac data to compute a direction cosine from said user receiver to each said used GPS satellite; and (d) using direction cosine data computed at step (c) to map each of said pseudo-range correction data corresponding to each of said used GPS satellites and for each time at which said stand-alone position was computed to obtain corrections to said user position.

19. The system of claim 18, wherein said reference station transmits said navigational signals other than in real-time.

20. The system of claim 18, wherein said system is selected from the group consisting of a local area differential global positioning system, and a wide area differential global positioning system.

* * * * *

UNITED STATES PATENT AND TRADEMARK OFFICE
CERTIFICATE OF CORRECTION

PATENT NO. : 5,764,184
DATED : June 9, 1998
INVENTOR(S) : HATCH et al.

It is certified that error appears in the above-indentified patent and that said Letters Patent is hereby corrected as shown below:

Column 10, line 6, immediately following "value" insert -- e.--

Signed and Sealed this

First Day of September, 1998

*Attest:*

BRUCE LEHMAN

*Attesting Officer*      Commissioner of Patents and Trademarks